US012597819B2

(12) United States Patent
Zhang et al.

(10) Patent No.: US 12,597,819 B2
(45) Date of Patent: Apr. 7, 2026

(54) INSULATION DEVICE, MOTOR STATOR AND MOTOR

(71) Applicant: Siemens Aktiengesellschaft, Munich (DE)

(72) Inventors: Xiao Hui Zhang, Nanjing (CN); Chao Wei, Nanjing (CN); Yong Le An, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 194 days.

(21) Appl. No.: 18/570,489

(22) PCT Filed: Jun. 18, 2021

(86) PCT No.: PCT/CN2021/101027
§ 371 (c)(1),
(2) Date: Dec. 14, 2023

(87) PCT Pub. No.: WO2022/261963
PCT Pub. Date: Dec. 22, 2022

(65) Prior Publication Data
US 2024/0283316 A1     Aug. 22, 2024

(51) Int. Cl.
*H02K 3/34*     (2006.01)
*H02K 1/16*     (2006.01)

(52) U.S. Cl.
CPC .............. *H02K 3/345* (2013.01); *H02K 1/16* (2013.01)

(58) Field of Classification Search
CPC ................................. H02K 1/16; H02K 3/345
(Continued)

(56) References Cited

U.S. PATENT DOCUMENTS 7,923,872 B2 *   4/2011   Sahara ................... H02K 3/522
                                                          310/194
8,076,816 B2 *  12/2011   Tsai .................... F04D 25/0646
                                                          310/67 R
(Continued)

FOREIGN PATENT DOCUMENTS

CN          207 234 566        4/2018   ............... H02K 3/46
CN          209 488 297       10/2019   ............... H02K 3/34
(Continued)

OTHER PUBLICATIONS

Extended European Search Report, Application No. 21945546.6, 9 pages, Jan. 23, 2025.
(Continued)

*Primary Examiner* — Rashad H Johnson
(74) *Attorney, Agent, or Firm* — Slayden Grubert Beard PLLC

(57)          ABSTRACT

Embodiments of the present disclosure include insulating devices, motor stators, and motors. The insulating device comprises at least one insulating frame and at least one insulating wrapping layer; the insulating frame has at least two support ends with the same orientation and arranged at intervals; the insulating wrapping layer is a cylindrical structure, and at least one open end of the cylindrical structure wraps the at least two support ends on the insulating frame and is supported by the support ends to form a winding space. The insulating device can balance the copper wire space factor and the manufacturing cost.

10 Claims, 4 Drawing Sheets

(58) Field of Classification Search
USPC ............................................................ 310/179
See application file for complete search history.

(56) References Cited

U.S. PATENT DOCUMENTS

| | | | | | |
|---|---|---|---|---|---|
| 8,247,935 | B2 * | 8/2012 | Onozawa | ................ | H02P 6/153 |
| | | | | | 310/68 B |
| 8,598,764 | B2 * | 12/2013 | Horng | ...................... | H02K 3/34 |
| | | | | | 310/194 |
| 8,661,651 | B2 | 3/2014 | Tsuiki et al. | .................... | 29/596 |
| 8,872,401 | B2 * | 10/2014 | Qi | ........................ | H02K 11/215 |
| | | | | | 310/194 |
| 9,004,880 | B2 * | 4/2015 | Lu | ........................ | H02K 5/1675 |
| | | | | | 417/354 |
| 9,083,210 | B2 * | 7/2015 | Chen | .................... | H02K 15/022 |
| 9,438,079 | B2 * | 9/2016 | Nace | .................... | H01R 39/385 |
| 9,876,399 | B2 * | 1/2018 | Aumann | ................ | H02K 1/165 |
| 11,894,735 | B2 * | 2/2024 | Lu | ............................ | H02K 7/14 |
| 12,074,498 | B2 * | 8/2024 | Lu | ........................ | H02K 11/30 |
| 2006/0012261 | A1 * | 1/2006 | Ku | ......................... | H02K 3/345 |
| | | | | | 310/67 R |
| 2015/0042180 | A1 * | 2/2015 | Kuroiwa | ................ | H02K 3/345 |
| | | | | | 310/43 |
| 2018/0358858 | A1 * | 12/2018 | Tsuiki | .................. | H02K 15/022 |
| 2019/0074735 | A1 | 3/2019 | Shono et al. | | |
| 2020/0052539 | A1 | 2/2020 | Hsu | ......................... | H02K 3/345 |
| 2024/0283316 | A1 * | 8/2024 | Zhang | .................... | H02K 3/345 |

FOREIGN PATENT DOCUMENTS

| | | | | |
|---|---|---|---|---|
| CN | 110 829 666 | 2/2020 | ............... | H02K 3/34 |
| CN | 112 910 120 | 6/2021 | ............. | H02K 1/18 |
| EP | 2790299 B1 | 10/2021 | ............. | G01N 21/15 |
| GB | 2 081 027 | 2/1982 | ............. | H02K 3/34 |
| JP | 2011259614 A | 12/2011 | ............. | H02K 1/16 |

OTHER PUBLICATIONS

Search Report for International Application No. PCT/CN2021/101027, 9 pages, Mar. 16, 2022.

* cited by examiner

INSULATION DEVICE, MOTOR STATOR AND MOTOR

CROSS-REFERENCE TO RELATED APPLICATIONS

This application is a U.S. National Stage Application of International Application No. PCT/CN2021/101027 filed Jun. 18, 2021, which designates the United States of America, the contents of which are hereby incorporated by reference in their entirety.

TECHNICAL FIELD

The present disclosure relates to insulation. Various embodiments of the teachings herein include insulating devices and systems, motor stators, and motors.

BACKGROUND

A motor stator is a static part of a motor. The motor stator includes a stator core and stator windings. If there is conduction between the stator windings or between the stator core and the stator windings, a short circuit will occur, so the insulation of motor stator is very important. At present, a specialized insulation device is widely used to insulate a motor stator. The insulation device includes insulation paper and insulation frame. The insulating paper is used to block the conduction between the stator windings and the stator core, and also to block the conduction between adjacent stator windings. The insulating frame is a frame structure supporting the insulating paper, so that the insulating paper can be firmly attached to the stator core. However, different insulation devices have different characteristics. Therefore, those skilled in the art are still committed to finding a better insulation device solution.

SUMMARY

Some embodiments of the present disclosure include insulating devices and systems, motor stators, and motors to balance the copper wire space factor and the manufacturing cost. For example, some embodiments include an insulating device comprising: at least one insulating frame (1), each insulating frame (1) has at least two support ends (11) with the same orientation and arranged at intervals; at least one insulating wrapping layer (2), each of which is a cylindrical structure; and at least one open end of the cylindrical structure cylindrical structure (2) wraps the at least two support ends (11) on the insulating frame (1) and is supported by the at least two support ends (11) to form a winding space (21).

In some embodiments, at least one end of each insulating wrapping layer (2) is provided with an extension part (24), which is folded and pressed by the insulating frame (1).

In some embodiments, each insulating frame (1) further comprises a pressing plate (14), and the pressing plate (14) presses the extension part (24).

In some embodiments, the insulating device further comprises a tablet (3) on which a column (31) is arranged; there is a pressing through hole (141) on the pressing plate (14), the tablet (3) is pressed on the pressing plate (14), and the column (31) is inserted into the pressing through hole (141) and pressed on the extension part (24).

In some embodiments, a contact surface between the support ends (11) and the insulating wrapping layer (2) is a streamline surface.

In some embodiments, the at least one insulating frame (1) comprises a first insulating frame (12) and a second insulating frame (13), and the first insulating frame (12) and the second insulating frame (13) support both ends of the insulating wrapping layer (2) respectively.

In some embodiments, the at least one insulating wrapping layer (2) comprises a first insulating wrapping layer (22) and a second insulating wrapping layer (23); and two sides of the first insulating frame (12) and the second insulating frame (13) have at least two support ends (11) respectively; the first insulating frame (12) and the second insulating frame (13) are arranged opposite to each other, and the support ends (11) on the first side of the first insulating frame (12) and the support ends (11) on the same side of the second insulating frame (13) are used to support both ends of the first insulating wrapping layer (22), the support ends (11) on the second side of the first insulating frame (12) and the support ends (11) on the same side of the second insulating frame (13) are used to support both ends of the second insulating wrapping layer (23).

As another example, some embodiments include a motor stator, comprises: a stator core (10) and an insulating device as described herein; the stator core (10) has at least one stator slot (101); and each insulating wrapping layer (2) is positioned in one stator slot (101) and runs through the stator slot (101), and each insulating frame (1) supports a corresponding insulating wrapping layer (2) from one end of the stator slot (101).

In some embodiments, the motor stator also comprises a stator winding (20); the stator winding (20) is wound in the winding space (21), and the support ends (11) are arranged between the stator winding (20) and the stator core (10), so that there is a predetermined distance (H) between the stator winding (20) and the stator core (10).

As another example, some embodiments include a motor stator, comprising: a stator core (10) and an insulating device as described herein; wherein the stator core (10) has a first stator slot (1011) and a second stator slot (1012) arranged adjacent to each other; the first insulating wrapping layer (21) in the insulating device is arranged in the first stator slot (1011), and the second insulating wrapping layer (22) in the insulating device is arranged in the second stator slot (1012); the support ends (11) on one side of the first insulating frame (12) and the second insulating frame (13) are arranged in the first stator slot (1011), and the support ends (11) on the other side of the first insulating frame (12) and the second insulating frame (13) is arranged in the second stator slot (1012).

As another example, some embodiments include a motor, comprising a motor stator as described herein.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

Figure 1:
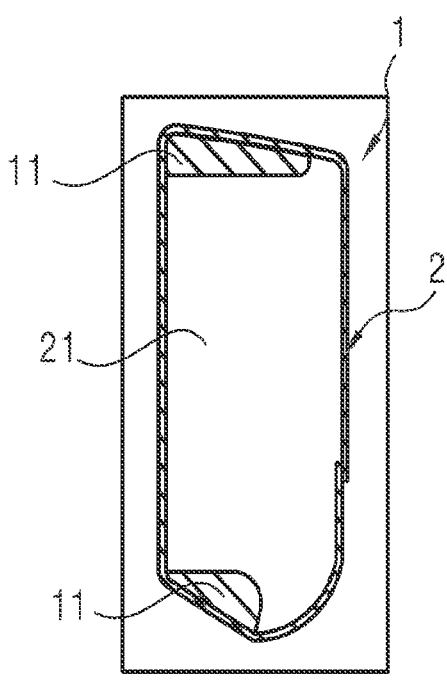
FIG. 1 is a structural diagram illustrating a cross-sectional structure of an example insulating device incorporating teachings of the present disclosure.

| The reference numerals are as follows: | |
| --- | --- |
| Reference numeral | Object |
| 1 | insulating frame |
| 11 | support end |
| 12 | first insulating frame |
| 13 | second insulating frame |
| 14 | pressing plate |
| 141 | pressing through hole |
| 2 | insulation wrapping layer |
| 21 | winding space |
| 22 | first insulating wrapping layer |
| 23 | second insulating wrapping layer |
| 24 | extension part |
| 3 | tablet |
| 31 | column |
| 10 | stator core |
| 101 | stator slot |
| 1011 | first stator slot |
| 1012 | second stator slot |
| 20 | stator winding |

DETAILED DESCRIPTION

In a more common structure of the insulation device, the insulating paper wraps the stator windings, and the insulating frame is arranged between the insulating paper and the stator windings to provide support for the insulating paper. Although the manufacturing cost of this structure is relatively low, the copper wire space factor is also relatively low, and the influence on the stator of small motor is more obvious. In addition, if the insulating frame is set on the outside of the insulating paper, because the insulating frame does not support the insulating paper from the inside, although the copper wire space factor meets the design requirements, the strength of the insulating paper itself is limited, so it is necessary to use glue to bond the insulating paper to the insulating frame, which increases the manufacturing cost. There is also a structure of the insulation device, in which the insulating frame is connected with the insulating paper to form a space for winding the stator windings. The insulating frame needs to have thicker material to ensure sufficient strength, and the manufacturing cost of the insulating frame will also increase. It can be seen that it is difficult for known insulation devices to balance the copper wire space factor and the manufacturing cost.

Some embodiments of the teachings of the present disclosure include at least two support ends extending in the same direction on the insulating frame, and use the support ends to support an insulating wrapping layer. Because only support ends are used to support the insulating wrapping layer, the material consumption of the insulating frame can be reduced, and then the manufacturing cost can be reduced. In addition, the insulating wrapping layer can be set as a tubular structure, When one end of the insulating wrapping layer is supported by the support ends, only the support ends occupies a small part of the one end of the insulating wrapping layer, so the insulating wrapping layer can thread more copper wires to improve the copper wire space factor.

Reference will now be made in detail to examples, which are illustrated in the accompanying drawings. In the following detailed description, numerous specific details are set forth in order to provide a thorough understanding of the present disclosure. Also, the figures are illustrations of an example. In other instances, well-known components have not been described in detail so as not to unnecessarily obscure aspects of the examples.

In order to be concise and intuitive in description, the scheme of the present disclosure is described through representative embodiments. A large number of details in the embodiments are only used to help understand the scheme of the present disclosure. However, the implementation of the technical solutions of the present disclosure cannot be limited to these details. In order to avoid unnecessarily blurring the scheme of the present disclosure, some embodiments are not described in detail, but only the framework is given. In the following, "including" means "including but not limited to", "based on . . . " means "at least based on . . . , but not limited to . . . ".

It should be understood that, as used herein, unless the context clearly supports exceptions, the singular forms "a" ("a", "an". "the") are intended to include the plural forms. It should also be understood that, "and/or" used herein is intended to include any and all possible combinations of one or more of the associated listed items.

FIG. 1 is a structural diagram illustrating a cross-sectional structure of an insulating device incorporating teachings of the present disclosure. As shown in FIG. 1, the insulating device comprises at least one insulating frame 1 and at least one insulating wrapping layer 2.

The insulating frame 1 is made of insulating material and is used to support the insulating wrapping layer 2. Each insulating frame 1 has at least two support ends 11 with the same orientation and arranged at intervals. The support ends 11 can be a long strip structure.

The insulating wrapping layer 2 is used for wrapping the copper wire and can be a flexible material with insulating characteristics. Each insulating wrapping layer 2 may be a tubular structure, which can be formed by overlapping or butting the edges after the two ends of the plane insulating paper are folded in opposite directions, or be integrally formed from other insulating flexible materials. At least one open end of the insulating wrapping layer 2 wraps the at least two support ends 11 of the insulating frame 1, and the at least two support ends 11 stretch the at least one open end to support the insulating wrapping layer 2 and form a winding space 21 for wrapping the copper wire.

Since the at least two support ends 11 occupy only a small part of the space of the open end of the insulating wrapping layer 2, other spaces of the open end can increase the wound copper wire, so that the copper wire space factor is improved. In addition, each of the support ends 11 is a long strip structure and inserted into the open end, and even if the thickness of each of the support ends 11 is relatively thick, the space for winding the copper wire will not be affected. More importantly, compared with the insulating frame in the prior art, the material used for the support ends 11 is also less, so the manufacturing cost of the insulating framework 1 material is not high. Moreover, because the support ends 11 are supported in the open end, the insulating wrapping layer 2 can be rigidly supported through the support ends 11 even if it is made of flexible material, and it does not need to be glued. To sum up, this embodiment balances the copper wire space factor and the manufacturing cost of the insulation device.

Figure 2:
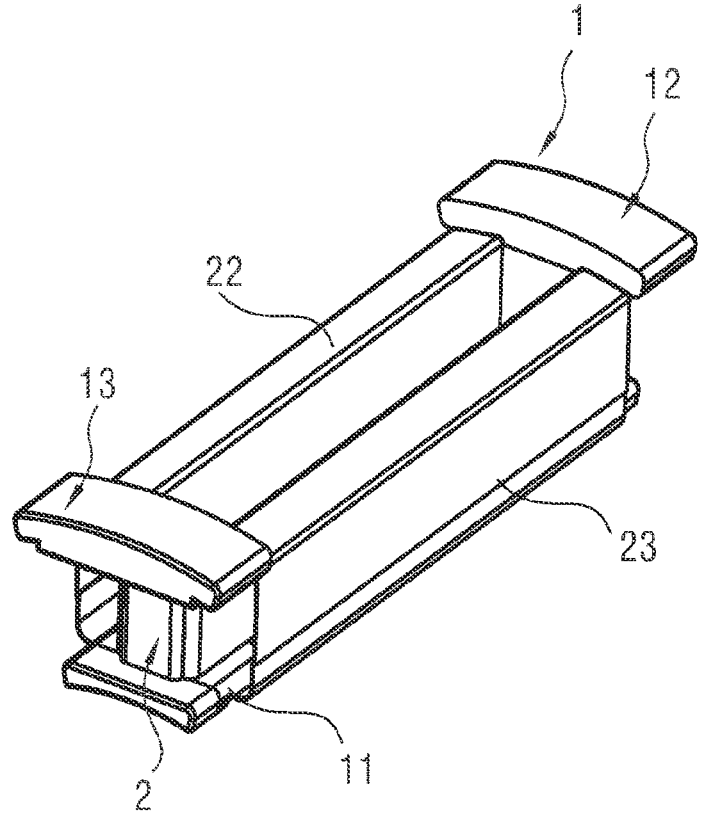
FIG. 2 is a structural diagram illustrating an overall structure of an example insulating device incorporating teachings of the present disclosure.
Figure 3:
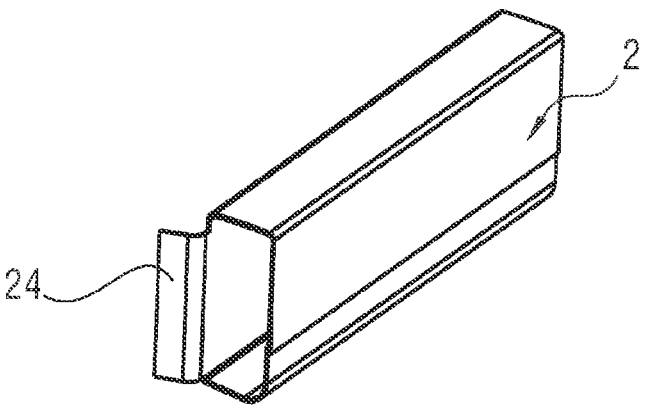
FIG. 3 is a structural diagram illustrating an example insulating wrapping layer incorporating teachings of the present disclosure.

FIG. 2 is a structural diagram illustrating an overall structure of the insulating device incorporating teachings of the present disclosure. FIG. 3 is a structural diagram illustrating an insulating wrapping layer incorporating teachings of the present disclosure. As shown in FIG. 2 and FIG. 3, in some embodiments at least one end of the insulating wrapping layer 2 is provided with an extension part 24, which is folded away from the center of the tubular structure and pressed by the insulating frame 1.

In this embodiment, a structure of an insulating wrapping layer 2 with an extension part 24 is provided. In order to make the insulating wrapping layer 2 better wrap the stator, at least one end of the insulating wrapping layer 2 is provided with an extension part 24. For example, both ends of the insulating wrapping layer 2 may be provided with an extension part 24, and the extension part 24 can be folded to the area between the adjacent stator slots of the stator core, The insulation frame 1 can press the extension part 24 to ensure that the insulation wrapping layer 2 can better wrap the stator.

Figure 4:
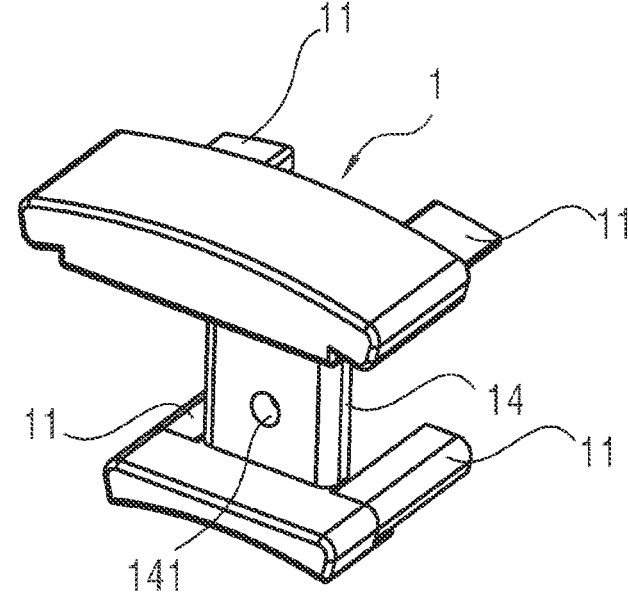
FIG. 4 is a structural diagram illustrating an example insulating frame incorporating teachings of the present disclosure.

FIG. 4 is a structural diagram illustrating an insulating frame incorporating teachings of the present disclosure. As shown in FIG. 4, the insulating frame 1 is provided with a pressing plate 14, which can be perpendicular to the extension direction of the support end 11 for pressing the extension part 24. In this embodiment, a structure of an insulating frame 1 with a pressing plate 14 is provided. After the insulation frame 1 and the insulation wrapping layer 2 are matched and installed, the pressing plate 14 presses the extension part 24 through a pressing surface.

Figure 5:
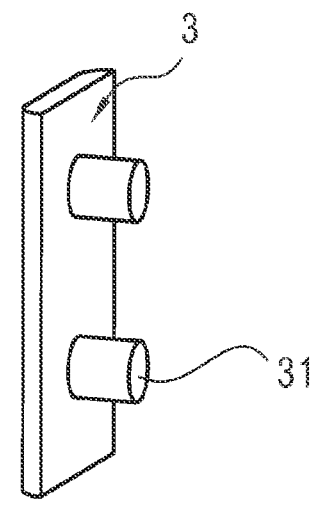
FIG. 5 is a structural diagram illustrating an example tablet incorporating teachings of the present disclosure.

FIG. 5 is a structural diagram illustrating a tablet incorporating teachings of the present disclosure. As shown in FIG. 5, the insulation device further includes a tablet 3, on which at least one column 31 is provided. Correspondingly, the pressing plate 14 is provided with at least one pressing through hole 141. The tablet 3 is pressed on the pressing plate 14 from the opposite surface of the pressing surface, and at least one column 31 is inserted into at least one pressing through hole 141 to press the extension 24.

In this embodiment, a structure of an insulating device including a tablet 3 is provided. In order to make the insulating frame 1 press the extension part 24 better, the pressing plate 14 is provided with at least one pressing through hole 141, at least one column 31 of the tablet 3 is inserted into at least one pressing through hole 141 from the opposite surface of the pressing surface, and the end surface and/or cylindrical surface of each column 31 can be coated with an adhesive layer, so that the column 31 can be adhered to the extension part 24 or the wall of the pressing through hole 141 after being inserted into the pressing through hole 141, so that the pressing structure is more stable. The column 31 and the hole 141 can be fixed by interference fit.

In some embodiments, the contact surface between the support end 11 and the insulating wrapping layer 2 is a streamline surface. In this embodiment, the specific structure of the contact surface is provided. Since the contact surface is used to support the insulating wrapping layer 2, the contact surface should have a smooth transition to avoid piercing the insulating wrapping layer 2. In addition, the contact surface should have a certain area to ensure that the insulating wrapping layer 2 is expanded along the contact surface after being supported.

In some embodiments, at least one insulating frame 1 includes a first insulating frame 12 and a second insulating frame 13, the first insulating frame 12 and the second insulating frame 13 are relatively arranged to support both ends of the insulating wrapping layer 2 respectively. In this embodiment, the first insulating frame 12 and the second insulating frame 13 support both ends of the insulating wrapping layer 2. The structure in the present embodiment can ensure that both ends of the insulating wrapping layer 2 are better supported and the structure is more stable.

In some embodiments, at least one insulating wrapping layer 2 includes a first insulating wrapping layer 22 and a second insulating wrapping layer 23. The first insulating frame 12 has two support end groups symmetrically arranged, and the second insulating frame 13 has two support end groups symmetrically arranged, and each supporting end group includes at least two support ends 11. The first insulating frame 11 and the second insulating frame 12 are arranged opposite to each other. The first side supporting end group of the first insulating frame 11 and the same side supporting end group of the second insulating frame 12 constitute the first pair of supporting end groups, and the second side supporting end group of the first insulating frame 11 and the same side supporting end group of the second insulating frame 12 constitute the second pair of supporting end groups. The first pair of support end groups is used to support both ends of the first insulating wrapping layer 22, and the second pair of support end groups is used to support both ends of the second insulating wrapping layer 23.

That is to say, two sides of the first insulating frame 12 and the second insulating frame 13 have at least two support ends 11 respectively; the first insulating frame 12 and the second insulating frame 13 bare arranged opposite to each other, and the support ends 11 on the first side of the first insulating frame 12 and the support ends 11 on the same side of the second insulating frame 13 are used to support both ends of the first insulating wrapping layer 22, the support ends 11 on the second side of the first insulating frame 12 and the support ends 11 on the same side of the second insulating frame 13 are used to support both ends of the second insulating wrapping layer 23.

The embodiment provides a specific structure in which at least two support ends 11 are respectively arranged on both sides of the first insulating frame 11 and the second insulating frame 12, the supporting ends 11 on one side support the first insulating wrapping layer 22 and the supporting ends 11 on the other side support the second insulating wrapping layer 23. The first insulating wrapping layer 22 and the second insulating wrapping layer 23 are symmetrically arranged on both sides of the first insulating frame 11 and the second insulating frame 12.

Figure 6:
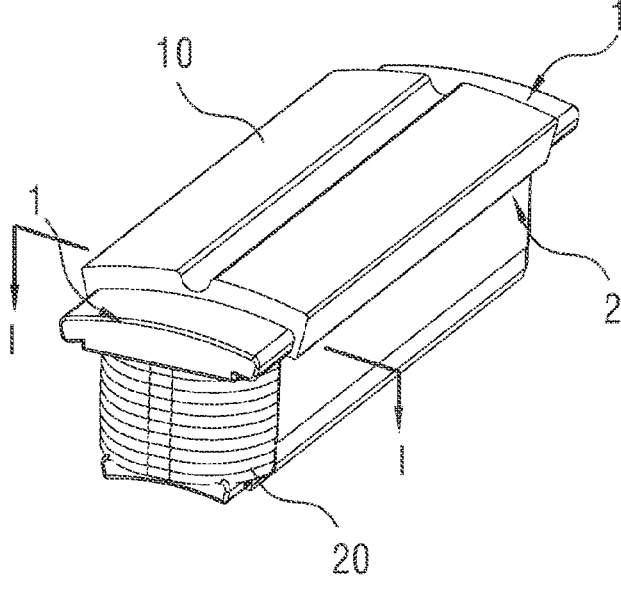
FIG. 6 is a local stereoscopic structure diagram of a motor stator with an example insulating device and winding incorporating teachings of the present disclosure.
Figure 7:
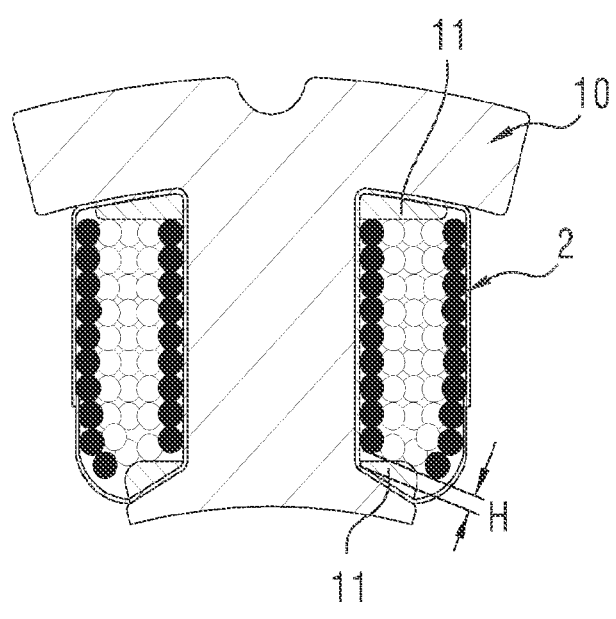
FIG. 7 is the I-I section structure diagram of FIG. 6 of the present disclosure.
Figure 8:
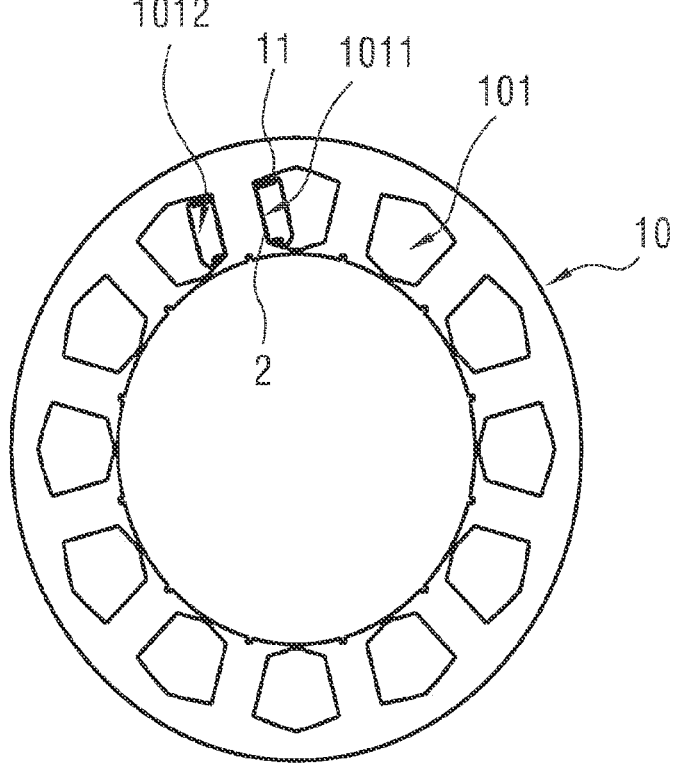
FIG. 8 is a plane structure diagram of an example motor stator incorporating teachings of the present disclosure.

FIG. 6 is a local stereoscopic structure diagram of a motor stator with an insulating device and winding incorporating teachings of the present disclosure, FIG. 7 is the I-I section structure diagram of FIG. 6 of the present disclosure, and FIG. 8 is a plane structure diagram of the motor stator incorporating teachings of the present disclosure. As shown in FIGS. 6 to 8, the example includes a motor stator with a stator core 10 and an insulating device.

The stator core 10 has at least one stator slot 101, and the case with 12 stator slots 101 is shown in FIG. 8.

Each insulating wrapping layer 2 is arranged in a stator slot 101 and runs through the stator slot 101, and each insulating frame 1 is installed at one end of the stator slot and supports the corresponding insulating wrapping layer 2 from the one end of the stator slot 101. A structure of a motor stator includes the insulating device. The stator core 10 is a cylindrical structure with a circular cross section. A plurality of stator slots 101 are evenly distributed along the circumference of the stator core 10, and each stator slot 101 runs through both ends of the stator core 10 along the axial direction of the stator core 10. Each insulating wrapping layer 2 of the tubular structure is inserted into one stator slot 101, and there are two insulating frame 1 corresponding to each insulating wrapping layer 2, which are respectively inserted into the two ends of the insulating wrapping layer 2. In addition, in FIG. 7, the area corresponding to the black circle will be completely occupied by an insulating frame in the prior art, so the copper wire space factor is low. In this embodiment, only the area corresponding to the black dot in the black circle is occupied by the support ends 11, and all other positions can be wound with the copper wire.

In some embodiments, the motor stator also includes a stator winding 20. The stator winding 20 is wound in the winding space 21, and the support ends 11 is positioned between the stator winding 20 and the stator core 10, so that there is a predetermined distance H between the stator winding 20 and the stator core 10.

The embodiment provides a specific structure of the motor stator with a stator winding 20. The predetermined distance H is to provide creepage distance to ensure the minimum distance between the stator winding 20 and the stator core 10 to prevent a breakdown.

In some embodiments, at least one stator slot 101 includes a first stator slot 1011 and a second stator slot 1012 which are arranged adjacent to each other. At least one insulating wrapping layer 2 comprises a first insulating wrapping layer 21 and a second insulating wrapping layer 22. The first insulating wrapping layer 21 is arranged in the first stator slot 1011, and the second insulating wrapping layer 22 is arranged in the second stator slot 1012.

At least one insulating frame 1 comprises a first insulating frame 12 and a second insulating frame 13. At least two support ends 11 are respectively provided on both sides of the first insulating skeleton 12 and at least two support ends 11 are respectively provided on both sides of the second insulating skeleton 13, and the supporting ends 11 on one side are arranged in the first stator slot 1011 and the supporting ends 11 on the other side are arranged in the second stator slot 1012.

In this embodiment, a specific assembly structure with adjacent first stator slot 1011 and second stator slot 1012 is provided. A plurality of stator slots 101 can be arranged on the stator core 10 along the circumference, and the plurality of stator slots 101 can be divided into multiple groups in pairs. Each group of stator slots 101 can adopt the structure of the insulation device in this embodiment. In this embodiment, the specific assembly structure of the motor stator is described by taking the first sub slot 1011 and the second stator slot 1012 as a group.

In some embodiments, the application provides a motor comprising a motor stator with the insulation device installed.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. An insulating device comprising:
an insulating frame with two support ends sharing an orientation and arranged at intervals; and
an insulating wrapping layer having an elongated hollow rectangular structure, the elongation defining a primary axis;
wherein an open end of the elongated hollow rectangular structure wraps the two support ends on the insulating frame and is in turn supported by the two support ends to form a winding space in an interior of the elongated hollow rectangular structure;
wherein a stator winding extends through the winding space along a primary axis.

2. The insulating device according to claim 1, wherein at least one end of each insulating wrapping layer includes an extension part folded and pressed by the insulating frame.

3. The insulating device according to claim 2, wherein the insulating frame further comprises a pressing plate pressing the extension part.

4. The insulating device according to claim 3, further comprising:
a tablet on which a column is arranged; and
a pressing through hole on the pressing plate;
wherein the tablet is pressed on the pressing plate; and
the column is inserted into the pressing through hole and pressed on the extension part.

5. The insulating device according to claim 1, wherein a contact surface between the support ends and the insulating wrapping layer comprises a streamline surface.

6. The insulating device according to claim 1, further comprising a second insulating frame; and
wherein the first insulating frame and the second insulating frame support both ends of the insulating wrapping layer respectively.

7. The insulating device according to claim 6, further comprising a second insulating wrapping layer; and
wherein two sides of the first insulating frame and the second insulating frame have at least two support ends respectively;
the first insulating frame and the second insulating frame are arranged opposite to each other;
the support ends on the first side of the first insulating frame and the support ends on the same side of the second insulating frame are used to support both ends of the first insulating wrapping layer; and
the support ends on the second side of the first insulating frame and the support ends on the same side of the second insulating frame are used to support both ends of the second insulating wrapping layer.

8. A motor stator comprising:
a stator core; and
an insulating device according to claim 7;
wherein the stator core has a first stator slot and a second stator slot arranged adjacent to each other;
the first insulating wrapping layer is arranged in the first stator slot and the second insulating wrapping layer is arranged in the second stator slot;
the support ends on one side of the first insulating frame and the second insulating frame are arranged in the first stator slot, and the support ends on the other side of the first insulating frame and the second insulating frame is arranged in the second stator slot.

9. A motor stator comprising:
a stator core with windings; and
an insulating device including an insulating frame with two support ends sharing an orientation and arranged at intervals, and an insulating wrapping layer having an elongated hollow rectangular structure, the elongation defining a primary axis;

wherein an open end of the elongated hollow rectangular cylindrical structure wraps the two support ends on the insulating frame and is in turn supported by the two support ends to form a winding space in an interior of the elongated hollow rectangular structure;

wherein the stator core has a stator slot;

wherein a stator winding extends through the winding space along a primary axis the insulating wrapping layer is positioned in a stator slot and runs through the stator slot; and the insulating frame supports a corresponding insulating wrapping layer from one end of the stator slot.

10. The motor stator according to claim 9, further comprising a stator winding wound in the winding space; and wherein the support ends are arranged between the stator winding and the stator core, at a predetermined distance between the stator winding and the stator core.

* * * * *